United States Patent
Prigent et al.

(10) Patent No.: US 7,676,836 B2
(45) Date of Patent: Mar. 9, 2010

(54) FIREWALL SYSTEM PROTECTING A COMMUNITY OF APPLIANCES, APPLIANCE PARTICIPATING IN THE SYSTEM AND METHOD OF UPDATING THE FIREWALL RULES WITHIN THE SYSTEM

(75) Inventors: Nicolas Prigent, Rennes (FR); Olivier Heen, Domloup (FR); Christophe Bidan, Thorigne Fouillard (FR); Olivier Courtay, Rennes (FR); Jean-Pierre Andreaux, Amsterdam (NL)

(73) Assignee: Thomson Licensing, Boulogne-Billancourt (FR)

( * ) Notice: Subject to any disclaimer, the term of this patent is extended or adjusted under 35 U.S.C. 154(b) by 1251 days.

(21) Appl. No.: 11/174,830

(22) Filed: Jul. 5, 2005

(65) Prior Publication Data

US 2006/0010491 A1   Jan. 12, 2006

(30) Foreign Application Priority Data

Jul. 9, 2004   (FR)   .................................... 04 51496

(51) Int. Cl.
*G06F 17/00* (2006.01)
(52) U.S. Cl. ............................... 726/11; 726/2; 726/12; 726/13; 709/223
(58) Field of Classification Search ................. 726/1–4, 726/11
See application file for complete search history.

(56) References Cited

U.S. PATENT DOCUMENTS

| | | | | |
|---|---|---|---|---|
| 5,968,176 A | * | 10/1999 | Nessett et al. | 726/11 |
| 6,212,633 B1 | | 4/2001 | Levy et al. | |
| 6,675,128 B1 | * | 1/2004 | Hellerstein | 702/182 |
| 7,249,187 B2 | * | 7/2007 | Sobel et al. | 709/229 |
| 7,322,044 B2 | * | 1/2008 | Hrastar | 726/22 |
| 7,325,248 B2 | * | 1/2008 | Syvanne | 726/11 |
| 7,496,910 B2 | * | 2/2009 | Voskuil | 717/168 |
| 2003/0097590 A1 | * | 5/2003 | Syvanne | 713/201 |
| 2003/0167405 A1 | * | 9/2003 | Freund et al. | 713/201 |
| 2003/0177355 A1 | * | 9/2003 | Elgressy et al. | 713/167 |
| 2003/0177389 A1 | * | 9/2003 | Albert et al. | 713/201 |
| 2005/0273841 A1 | * | 12/2005 | Freund | 726/1 |

FOREIGN PATENT DOCUMENTS

| | | | |
|---|---|---|---|
| EP | 0 854 621 A | | 7/1998 |
| EP | 1 313 290 A | | 3/2003 |

* cited by examiner

*Primary Examiner*—Ponnoreay Pich
(74) *Attorney, Agent, or Firm*—Robert D. Shedd; Joseph J. Opalach; Jerome G. Schaefer

(57) ABSTRACT

The invention relates to the protection by firewall of a domestic community of interconnectable appliances.

The invention allows distributed and totally decentralized management of the firewall policy, implemented at the level of each appliance, which is consistent and adapts dynamically to the changes occurring within the domestic network. We shall speak of ubiquitous firewalls.

13 Claims, 3 Drawing Sheets

FIREWALL SYSTEM PROTECTING A COMMUNITY OF APPLIANCES, APPLIANCE PARTICIPATING IN THE SYSTEM AND METHOD OF UPDATING THE FIREWALL RULES WITHIN THE SYSTEM

This application claims the benefit, under 35 U.S.C. § 119 of French Patent Application 0451496, filed Jul. 9, 2004.

FIELD OF THE INVENTION

The present invention relates to the securing of a community of interconnectable appliances and more particularly to the management of the policy of firewall rules making it possible to filter the traffic between these appliances and the network to which they are connected.

BACKGROUND OF THE INVENTION

A local network, and more particularly a domestic network, is formed of a set of devices (televisions, digital recorders, computers, personal digital assistants, etc.) networked together and which self-configure and interact in a manner that is transparent to the user so as to offer him enhanced services. UPnP described in "UPnP™ Device Architecture 1.0", HAVi described in "HAVi Specification version 1.1" and Rendezvous described by E. Guttman in "Autoconfiguration for IP networking: Enabling local communication" IEEE Internet Computing, May 2001, are a few current proposals for standards for domestic networks. The appliances belonging to a user or a family of users will share one and the same security policy. These appliances are interconnectable via multiple networks. These networks may be wired networks within the home such as IEEE 1394, IEEE Ethernet or the like. They may also be wireless networks such as IEEE 802.11, Bluetooth or the like. The appliances may also communicate via the Internet such as for example a mobile device that the user will have carried with him to his workplace and which will communicate with the network of the residence via the company network and the Internet.

These communities must be made secure if one wishes to deploy them widely. Specifically, there are motives and genuine opportunities for attacking the appliances of a user. The first step for securing a community of domestic appliances consists in marking its boundary, that is to say in defining which devices belong to the community.

The second step for securing these domestic communities is to define a policy for filtering the communications between the appliances of the community and the outside world, or even between the appliances of the community themselves. Filters of this kind, called firewalls, are well known. There exist several types of firewall.

In particular, it is known to equip a company network with a firewall disposed on the link between this company network and the outside. Specifically in this type of network, all the communications between the network and the outside pass via one or more well-identified points of connection. In this case the firewall is administered by the competent personnel in a position to define the security policy and to implement it.

It is also known to equip a personal computer linked directly to the Internet with what is commonly referred to as a personal firewall. This firewall is a software filter on the computer filtering the network traffic between the computer and the outside world. This filter is effected as a function of a policy defined by the user. For this purpose, tools exist allowing him to express this policy in a simple manner and to translate it into the form of packet filter rules as a function of the protocols used, of the services used or of the direction of the communication. Despite these tools intended to facilitate the user's task, he is nevertheless in charge of the management of his firewall and of alterations to the security policy on his computer.

For the management of the firewall policy in networks possessing several points of access to the outside has been developed the notion of distributed firewall. In this type of firewall, the security policy is defined at a point of the network serving as policy server and applied at multiple points, typically on all the network access points. In this way, the consistency of the firewall policy is ensured over the whole network by centralizing the policy rules and their updating at a single point.

The characteristics of the communities of modern domestic appliances raise a certain number of problems when attempting to protect them with a firewall according to one of the techniques mentioned above. The use of RF media, which are by nature shared, the communication between devices across the Internet, the uncovering and the automatic exchanging of services between devices placed face to face are so many factors that blur the physical boundary of domestic networks and the location of the points of access between the appliances of the domestic network and the outside. In such a community, each appliance is able to communicate with appliances outside the network without this communication necessarily passing through an identified access point.

Moreover, the appliances of the domestic community are liable to develop a fault, to be turned off or carried away by the user beyond reach of the means of communication of the remainder of the community. It is therefore clear that the security policy must apply on the one hand to the appliances carried away from the residence and to those that remain within the residence. It is not therefore possible to bank on the presence in the network of an appliance playing a privileged role to ensure the security of the community. Moreover, it is necessary that the policy take account of alterations to the community, the addition or the removal of new appliances.

SUMMARY OF THE INVENTION

The invention allows distributed and totally decentralized management of the firewall policy, implemented at the level of each appliance, which is consistent and adapts dynamically to the changes occurring within the domestic network. We shall speak of ubiquitous firewalls.

The invention relates to a firewall system making it possible to secure a community of interconnectable appliances sharing a set of at least one common global security rule, each appliance of the community possessing means for storing a local security policy consisting at least of global security rules, of a list of the members of the community as well as of their state of connection and of a list of services offered locally, a plurality of appliances of the community comprising a filter of messages destined for and originating from the network to which it is connected where, the system comprising no centralized means, it possesses on each appliance of the community local means of calculating the rules used by the filter as a function of the local security policy.

According to a particular embodiment of the invention, the system possesses on each appliance of the community means for updating the local security policy and of triggering a new calculation of the rules used by the filter.

According to a particular embodiment of the invention, the system possesses means of triggering a new calculation of the rules used by the filter in reaction to changes occurring on the network.

According to a particular embodiment of the invention, the changes taken into account for triggering a new calculation of the rules used by the filter are at least one among the following: the change of network address of an appliance of the community, the addition, the removal or the banishing of an appliance of the community and the change of status of a service hosted on an appliance of the community.

According to a particular embodiment of the invention, the changes taken into account to trigger a new calculation of the firewall rules used by the filter are at least one among the following: the change of network address of an appliance of the community, the addition, the removal or the banishing of an appliance of the community and the change of status of a service hosted locally on the appliance.

According to a particular embodiment of the invention, the system possesses on each appliance of the community means for determining the list of the appliances outside the community possessing privileged accesses to at least one service offered by an appliance of the community, this list being integrated with the local security policy.

The invention also relates to an appliance comprising means for belonging to a community of interconnectable appliances sharing a set of at least one common global security rule, possessing means of storing a local security policy consisting at least of global security rules, of a list of the members of the community as well as of their state of connection and of a list of services offered locally, the said appliance possessing a firewall comprising a filter of the messages destined for and originating from the network to which it is connected such that it possesses local means of calculating the firewall rules used by the filter as a function of the local security policy, calling upon no centralized means.

According to a particular embodiment of the invention, the appliance possesses means of updating the local security policy and of automatically triggering a new calculation of the rules used by the filter.

According to a particular embodiment of the invention, the appliance possesses means of triggering a new calculation of the rules used by the filter is effected in reaction to changes occurring on the network.

According to a particular embodiment of the invention, the changes taken into account for triggering a new calculation of the rules used by the filter are at least one among the following: the change of network address of an appliance of the community, the addition, the removal or the banishing of an appliance of the community and the change of status of a service hosted on an appliance of the community.

According to a particular embodiment of the invention, the changes taken into account to trigger a new calculation of the firewall rules used by the filter are at least one among the following: the change of network address of an appliance of the community, the addition, the removal or the banishing of an appliance of the community and the change of status of a service hosted locally on the appliance.

According to a particular embodiment of the invention, the appliance possesses means for determining the list of the appliances outside the community possessing privileged accesses to at least one service offered by an appliance of the community, this list being integrated with the local security policy.

The invention also relates to a method of updating rules used by a firewall consisting of a filter of the messages destined for and originating from the network to which is connected the appliance implementing the method, the appliance forming part of a community of interconnectable appliances sharing a set of at least one common global security rule, the appliance possessing means of storing a local security policy consisting at least of global security rules, of a list of the members of the community as well as of their state of connection and a list of services offered locally, the said rules being calculated as a function of the local security policy, comprising at least the following steps:
 the detection of the addition, the removal and the banishing of an appliance of the community;
 the detection of the changes of network address of an appliance of the community;
 the triggering of a new calculation of the rules in response to the change of the local security policy.

According to a particular embodiment of the invention, the method furthermore possesses a step of detecting the changes of status of the services hosted by the appliance.

According to a particular embodiment of the invention, the method furthermore possesses a step of detecting the changes of status of the services hosted by an appliance of the community.

According to a particular embodiment of the invention, the triggering of a new calculation of the firewall rules is related to the detection of the addition, the removal and the banishing of an appliance of the community, to the detection of the change of IP address of an appliance of the community and of the change of status of a service.

BRIEF DESCRIPTION OF THE DRAWINGS

The invention will be better understood, and other features and advantages will become apparent on reading the description which follows, the description making reference to the appended drawings among which.

DESCRIPTION OF PREFERRED EMBODIMENT

An exemplary embodiment of an ubiquitous firewall and of the management of the security policy using such a firewall will now be described. The exemplary embodiment is given within the framework of a community of domestic appliances communicating via the IP protocol ("Internet Protocol"). The specification for the IP protocol may be found in the RFCs, request for comments, maintained by the IETF, the Internet Engineering Task Force under number 791. However the person skilled in the art will understand that the invention may be applied to any type of communication network, regardless of the protocol used, for example IEEE 1394 or the like.

The constraints that have to be coped with in community of domestic appliances are the following.

Firstly, the appliances are liable to be on or off at any moment. It is therefore necessary to manage the arrival and the departure of these appliances of the network.

The appliances of the community may be physically connected to appliances not belonging to the community. In particular for the wireless communications, the appliances connected to the physical network are not necessarily part of the community. Likewise, any appliance is liable to become a point of access between the community and the outside world. The physical boundaries of the network interconnecting the community are therefore not clearly defined.

Not all the appliances belonging to the community are necessarily in a position to communicate together at any moment. For example a user, away from his home, may make a portable telephone communicate with a digital assistant which between them will constitute a subnetwork disconnected from the appliances remaining in the residence. These appliances, disconnected from the remainder of the domestic network, must be able to apply the security policy defined for the community. The community is therefore liable to be separated into an arbitrary number of partitions temporarily unable to communicate together. Likewise, the environment and the properties of an appliance may change over time. Thus an appliance may for example change IP address between two successive connections to the network.

Moreover, it is not possible to count on the help of a competent administrator to administer the domestic community in contradistinction to what occurs on a company network for example. Specifically the user does not generally have the competence or the time to delve into the problems of customizing a firewall. However, at the same time he is the sole authority over the community. It is therefore necessary to provide him with a simple means of expressing the security policy and of translating it in a transparent manner into firewall rules.

Figure 1:
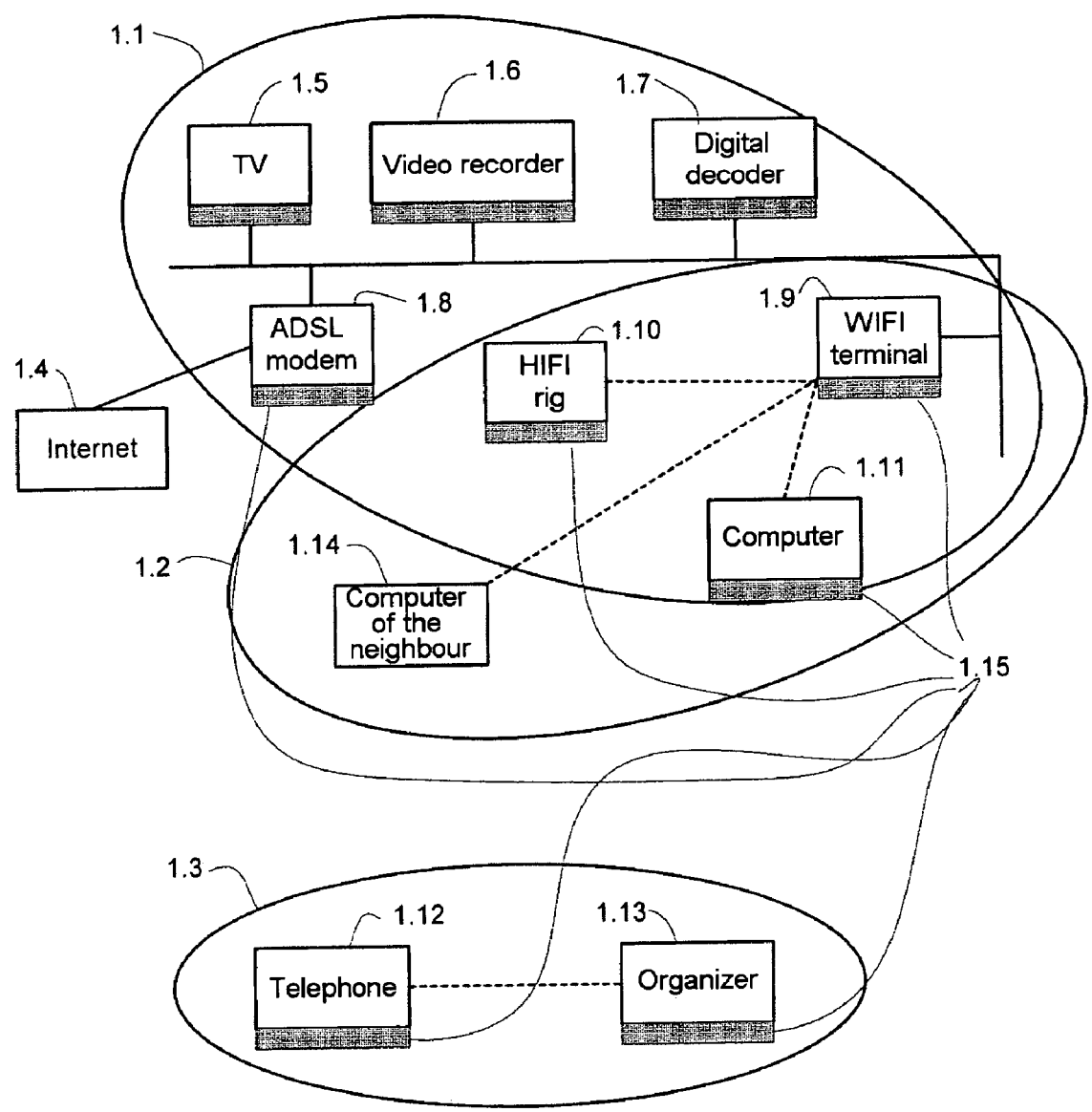
FIG. 1 represents an overall diagram of a community of domestic appliances protected by the invention.

FIG. 1 illustrates an exemplary domestic community. The domestic community consists on the one hand of the appliances of the space referenced 1.1 and situated in the residence and of the appliances situated in the space 1.3 situated outside the residence. It is assumed here that these two spaces cannot communicate with one another. The space of the residence 1.1 contains on the one hand a wire network linking a television 1.5, a digital video recorder 1.6, a digital decoder 1.7, while an ADSL modem 1.8 gives access to the Internet 1.4 and a wireless terminal 1.9, operating for example according to one of the protocols of the 802.11 family, allows the connection of a HIFI rig 1.10 and of a computer 1.11. The 802.11 standard family defines a standard for communication over a wireless network standardized in the ANSI/IEEE document std 802.11-1999 (reaff 2003). The computer of the neighbour 1.14, having wireless capacity, can connect up physically to the wireless network 1.2 although not forming part of the domestic community. The user, outside of his residence, can connect together for example a digital organizer 1.13 and a mobile telephone 1.12 by a wireless connection according to, for example, the Bluetooth protocol, to form a partition 1.3 of the community. This partition being called on to again be connected to the remainder of the community upon the return of the user to his residence. The ubiquitous firewall device, referenced 1.15, is decentralized on each appliance and demarcated by the grey rectangle appearing on the appliances of the community.

To ensure the security of communities of domestic appliances it is necessary to define a security policy and the security services which will enable this policy to be implemented. The security policy of a domestic community is much like the one that can be found in a conventional company network. It is composed of two parts.

A first part raises the problem of membership of the community. Specifically the first problem to be solved is that of the definition of the boundary of the community. A domestic community will constitute a domain of application of a uniform security policy. All the appliances of one and the same community will share a common security policy and will share a high mutual level of trust. It is generally considered that the appliances of one and the same community can communicate freely with one another. This problem is resolved, for example, by the technique described in the following document: "Gestion sécurisée de groupes de dispositifs dans un réseau domestique" [Secure management of groups of devices in a domestic network] by Nicolas Prigent and Jean-Pierre Andreaux published in the proceedings of the second symposium on security of information and communication technologies (SSTIC 2004). In this document it is explained how the user can easily define the appliances belonging to his domestic community with the aid of a cryptographic provable identity of each appliance. The user is in a position to manage the addition and the removal of the appliances of the community.

The second part of the security policy of the community is intended to manage the communications between the appliances of the community and the outside world. This therefore involves communications between the appliances of the community and the appliances not belonging to the community but able to communicate with the appliances of the community. Here are found appliances accessible via the Internet or appliances brought by guests into the residence and temporarily connected to the domestic network of the user. As the appliances inside the domestic community are supposed to conform to the security policy, it is generally admitted that the communications initiated by appliances forming part of the community are free to exit the community. Conversely, the communications initiated by appliances outside the community must be monitored and their compliance with the security policy be guaranteed. In practice, access to the services offered by the appliances belonging to the community must have been explicitly authorized by the user in order for the requests destined for these services to be accepted at the boundary of the community.

More precisely, a service on an appliance of the community will be able to be declared as public (that is to say that any appliance outside may access same), restricted (that is to say that access to this service by an outside appliance is subject to a condition) or private (access by an outside appliance is prohibited). It is then necessary to verify the compliance of the communications initiated by an appliance outside the community with this policy.

It is clear that the security policy described is an example and that the rules thus defined may be modified without departing from the framework of the exemplary embodiment.

An exemplary mode of implementation of this security policy will now be described. For this purpose, we shall define the concept of ubiquitous firewall. On account of the constraints already described, it is impossible to make an appliance of the community play a particular role, the security policy having to be ensured on all the appliances without presupposing the presence and the accessibility of another appliance of the community on the domestic network. Consequently a firewall service, termed ubiquitous, will be defined at the level of each appliance of the community.

Figure 2:
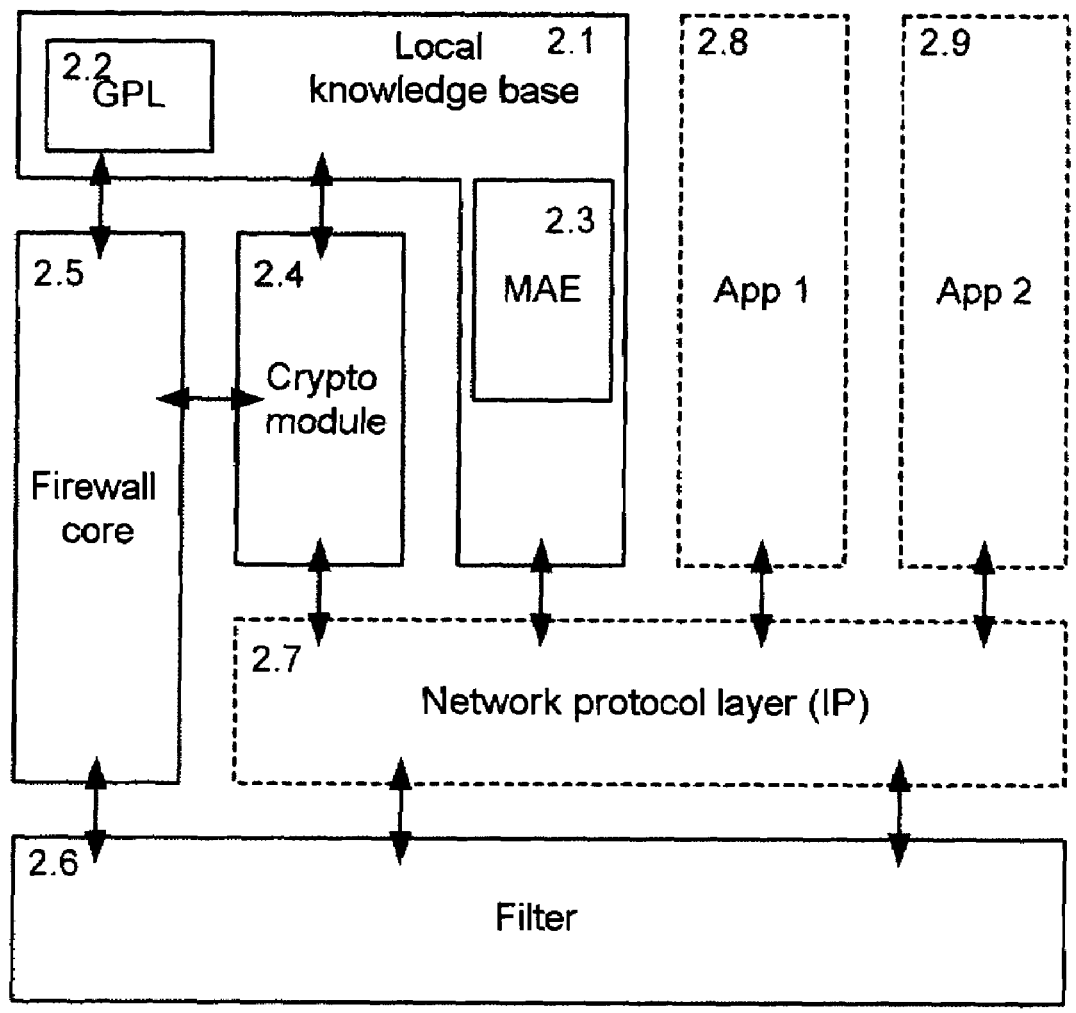
FIG. 2 represents an exemplary embodiment of an architecture of an ubiquitous firewall.

FIG. 2 illustrates the architecture of this service. It is composed of a local knowledge base, referenced 2.1, which contains the information pertaining to the policy as well as the information regarding the current environment of the appliance. This information is used by the core of the ubiquitous firewall, referenced 2.5, to generate the firewall rules. This local knowledge base itself comprises the local policy manager (GPL), referenced 2.2, whose task is to acquire, to store and to manage the information relating to the security policy and the module for adaptation to the environment (MAE), referenced 2.3 whose role is to acquire, store and manage the information regarding the environment of the appliance. The cryptography module, referenced 2.4, occupies itself with the operations of authentication between the local appliance and the other appliances, as well as keys possibly used to establish secure communication channels. The ubiquitous firewall core, referenced 2.5, for its part occupies itself with generating the rules used by the message filter, referenced 2.6, on the basis of the information contained in the local knowledge base and by possibly using the keys obtained from the cryptography module. The message filter, referenced 2.6, applies the rules thus obtained to the messages emanating from, and directed to, the network protocol layer, in this instance, the IP layer. The applications, referenced 2.8 and 2.9, will access the network protocol layer in a transparent manner and will receive the messages after application of the filter.

The local policy manager is in charge of the acquisition, of the storage and of the management of the security policy. It manages the relevant information relating to the generic global policy, which is the same for all the appliances of the community. An example of this policy is formed of the following two rules:

the appliances belonging to the domestic community are free to communicate with one another, in a secure manner or otherwise.

Access by appliances outside the domestic community to the services offered by the appliances of the community is monitored.

By using this general policy as well as the specific information which it possesses regarding the domestic community, in particular the list of the appliances of the community and their state of connection, as well as the list of the services offered, locally or by the community, and their public, restricted or private status, the manager is capable of constructing its own local view of the security policy.

In particular, the local policy manager possesses a first category of information regarding the boundaries of the community. It contains mainly information regarding the appliances belonging to the domestic community and regarding the method making it possible to identify them and to authenticate them. Each device of the domestic community is furnished with a provable identity, which allows it to be identified and to authenticate itself with the other devices of its network. We shall call an identity which is easy to verify, but very difficult to usurp, and which allows the secure installation of cryptographic hardware a "provable identity". For example, the public key of a public/private pair of keys may be used as provable identity; a device pretending to be identified by its public key can sign a challenge using its private key, and it alone is able to decrypt a message which has been encrypted with its public key. Moreover, by making use of their respective provable identities, two devices can create a secure communication channel, allowing them in particular to possibly install symmetric session keys by using a protocol of agreement regarding the keys for example. These point-to-point session keys may serve for subsequent authentications and to secure the communications (authenticity and confidentiality) between the two devices.

There exist numerous known methods for dependably ensuring an appliance's membership of a community including that already cited "Secure management of groups of devices in a domestic network".

The local policy manager possesses a second category of information regarding the communications authorized to cross the boundary of the domestic community or otherwise. In this category is found, firstly, the list of public services offered by the device, such as for example public HTTP servers. Also found therein is the list of restricted services. These services are therefore accessible only under certain conditions. For each of these services the manager possesses information regarding the conditions which must be fulfilled for access to this service. An example of such information may be a user name and a password with the method of authentication used, the knowledge of a particular cryptographic item of information, a list of explicitly authorized appliances, a domain whose appliances are authorized or any other condition. There exist several sources of information for the local policy manager. This may be the user or a legitimate source of security policy such as another appliance of the domestic community.

Certain modifications occurring in the local policy are shared between the various appliances of the community. These modifications may be of several types. On the one hand, the user may add, remove or banish an appliance of the community. The addition may be made from a community appliance connected to the new appliance on which the user will indicate that the new appliance should be considered to form part of the community. The removal of an appliance may be done on the appliance that the user wishes to remove from the community or on another appliance belonging thereto. The banishing relates to the procedure by which a user will indicate to the community that an appliance to which it no longer has access must cease to be considered as a member of the community. The mechanisms making it possible to implement same are described in the document already cited "Secure management of groups of devices in a domestic network". These modifications will therefore be taken into account by all the appliances of the community as soon as they are in a position to communicate.

Another type of change of policy is the change of status of a service on an appliance of the community. Here two solutions may be envisaged. The first consists in saying that only the list of services hosted on an appliance forms part of the local policy of this appliance. With this in mind there is no need to transmit on the other appliances a change of state of a service occurring on an appliance. The consequence of this solution is that the blocking of an unauthorized request for a service hosted on a given appliance will only be possible on this same appliance. The other appliances of the network that have no knowledge of the status of the services will therefore relay the request without being able to verify its compliance with the security policy. The second solution consists in transmitting the information regarding the state of the services on all the appliances of the community. In this case, any change in the state of a service on an appliance will automatically be sent to all the connected appliances of the community. An update will take place on the appliances not connected at the time of the change during their next connection. This solution makes it possible to block a noncompliant request as soon as it arrives on the first appliance of the community. The change of the state of a service by the user can be authorized only on the appliance hosting the service. In this case, there can be no conflict of policy during the connection of two partitions of the community, the state defined in the partition hosting the service always being considered to be the correct state to be transmitted on the appliances of the other partition. In the case where the user is authorized to change the state of a service from any appliance of the community it may happen that two partitions of the community having a different state for a given service are connected. This kind of conflict may be settled, either by taking account of the schedule of the last change of state, or by soliciting the arbitration of the user to confirm the choice between the two states.

The module for adaptation to the environment is, for its part, responsible for the management of the association between the identity of the appliances and the network address, in this instance IP, that they possess at a given moment. Specifically, this information is indispensable when it is desired to send a message to an appliance that is otherwise known only by its provable identity. This module also keeps the association between the addresses and the identities of the privileged appliances having access to the community. That is to say appliances that although not forming part of the community will have privileged access to certain services of the community. One of the multiple solutions for this module to be able to acquire and keep up to date the associations between the identities of the appliances and their address on the network consists, for each appliance, in periodically transmitting its address and its identity over the network.

When the module for adaptation to the environment receives a message of this type, it can then verify that this identity is legitimate so as to combat ever possible usurping. It is also this module which is in charge of transmitting the periodic announcement messages in such a way that the MAEs of the other appliances can also update themselves.

The cryptographic data module will, for its part, have at least two main functions. On the one hand it will be in charge of the management of the provable identity of the appliance. On the other hand, it will also serve to construct secure communication channels. Specifically, since it is not possible to prevent an outside and potentially malevolent appliance from physically accessing the network, it may be useful to secure the communications between the appliances of the community. It is therefore possible to create a virtual private network grouping together the appliances of the domestic community. On account of the erratic connection properties within the domestic network the establishment of a secure communication channel must not require the presence of more than two appliances in the community. Based on the local knowledge that it has of the community, each appliance is in a position to ensure the point-to-point security of its communications with the other appliances. For reasons of performance, the use of symmetric cryptography is favoured, but it is obvious that asymmetric cryptography may also be used. The use of symmetric cryptography requires the symmetric installation of point-to-point keys in the appliances. For reasons of ease of use, it is not possible to ask the user to define and to input these symmetric keys into the appliances. Moreover this would be counterproductive at the security level: there is in fact a risk that the user may choose weak keys. The installation of the keys may be done, for example, by using the STS ("Station To Station") protocol defined in the document "Authentication and authenticated key exchanges." *Design Codes and Cryptography,* 2:107-125, 1992, by W. Diffie, P. van Oorschot and M. Wiener. The keys are therefore installed in an unconditional manner without the intervention of the user who does not have knowledge of the keys used. This makes it possible to obtain a good level of security as well as good ergonomics of the system. Another advantage of this system of point-to-point keys is its resistance to the corruption of an appliance. Specifically, if an attacker were to take control of an appliance, the communications between the other appliances are not compromised on account of the fact that the keys are strictly point-to-point between each pair of appliances of the community. The system operates, moreover, as soon as two appliances are present in the domestic community. The limited size of a domestic community and the totally distributed management of the keys implies that the number of keys to be managed per appliance increases linearly with the size of the community and remains reasonable.

The core of the firewall is in charge of the generation of the firewall rules that will be used by the filter. This generation is effected on the basis of the policy rules in the following manner.

Firstly, the core of the firewall will establish the rules authorizing the communications necessary to the operation of the ubiquitous firewall. This involves messages exchanged between the MAEs to announce and detect the appliances with which it is possible to communicate, as well as messages exchanged by the cryptography modules to allow the authentication and the exchange of point-to-point keys in the case where secure communication channels are installed. These messages between the cryptography modules, although not indispensable to the operation of an ubiquitous firewall, are necessary for the establishment of a high level of security within the domestic community. It is also necessary to authorize the messages between the local knowledge bases, as well as, possibly, those useful for obtaining a network address such as a DHCP request or the like. All these communications are authorized without being made secure (encrypted or authenticated) at the filter level.

Secondly, the core of the firewall will establish the rules allowing communication between appliances of the community. Any message originating from an address identified by the module for adaptation to the environment as belonging to the community will possibly be decrypted and its authenticity will possibly be verified, by virtue of the provable identity of the known source, or the symmetric key or keys installed by the cryptographic module. If authentication is installed, the message will be accepted if the authentication is correct and denied otherwise. If no authentication is installed, the message is accepted.

Likewise, for any message destined for an appliance of the community, its encryption and its authentication will possibly be carried out based on the provable identity of the destination, or on the symmetric key or keys installed by the cryptography module, then it will be dispatched.

The core of the firewall will also define the rules governing the communications pertaining to the privileged services. The rules must implement the checks for verifying the access conditions. For example if the policy indicates that an appliance possessing a suchlike provable identity can access a given privileged service, then the MAE can be used here to ascertain the IP address corresponding to this provable identity so as to generate the rule authorizing the requests destined for this service and originating from this address. It is also possible to use the properties of the secure group of IP protocols IPsec to filter the requests to a service that are encrypted with the aid of a shared secret. The specification of the IPsec protocol group may be found in the RFCs, request for comments, maintained by the IETF, Internet Engineering Task Force under the number 2401, and the description of a part of the protocols of which it is composed AH, ESP and IKE respectively under numbers 2402, 2406 and 2409. On the other hand, the services whose access is made secure by a higher level authentication method will be declared as public services and in this case authentication will be done at the service level. In this case, access to an HTTP server accessible via a user name and a password may be cited. In this case, the checks are not possible at the level of the network protocol layer.

The core of the firewall will likewise generate the rules authorizing the communications pertaining to the public services regardless of the source of the messages.

Finally, the core of the firewall will generate the rules prohibiting any incoming connection other than those explicitly authorized by one of the rules hereinabove and authorizing any outgoing connection. Specifically, by default, all the services are considered to be private.

These rules are regenerated with each modification of the security policy, or when the environment of the appliance is modified. These modifications may come from the modification of the topology, that is to say from the addition or from the removal of one or more appliances of the network. It may be remarked here that the removal of an appliance of the network, that is to say the loss of connectivity of an appliance which does not leave the community, does not require a new generation of the firewall rules. No more than a return of connectivity as long as its IP address is not modified. Hence only the change of IP address of an appliance of the community or of an appliance authorized to access a privileged service, the removal, the addition and the banishing of an appliance of the community are events requiring a new generation of the firewall rules. This modification may also come from the modification of the policy relating to a service available within the community. As we have seen, this modification may be managed entirely locally on the appliance hosting the service which alone will have to generate a new set of rules or this modification may be transmitted within the community and then require a new generation on all the appliances of the community. As this generation is totally automated, a set of firewall rules that is consistent with the security policy of which it is knowledgeable is available to the appliance at any instant.

The user is the sole authority within the community. It is therefore he alone who can define the status, public, private or restricted, of the services offered by the appliances that he possesses. To do this, he will have to authenticate himself on the appliance hosting the service whose status he wishes to modify. The manner of authenticating himself on the appliance will depend on the appliance and is not necessarily uniform within the community. It may involve a code to be input to a mobile telephone, a password to a television or the like. Once authenticated as authority on the appliance, the user is presented with a list of the services offered by the appliance and can modify the status thereof. The latter may also specify, for the restricted services, the access condition as the shared secret to be used for example.

Figure 3:
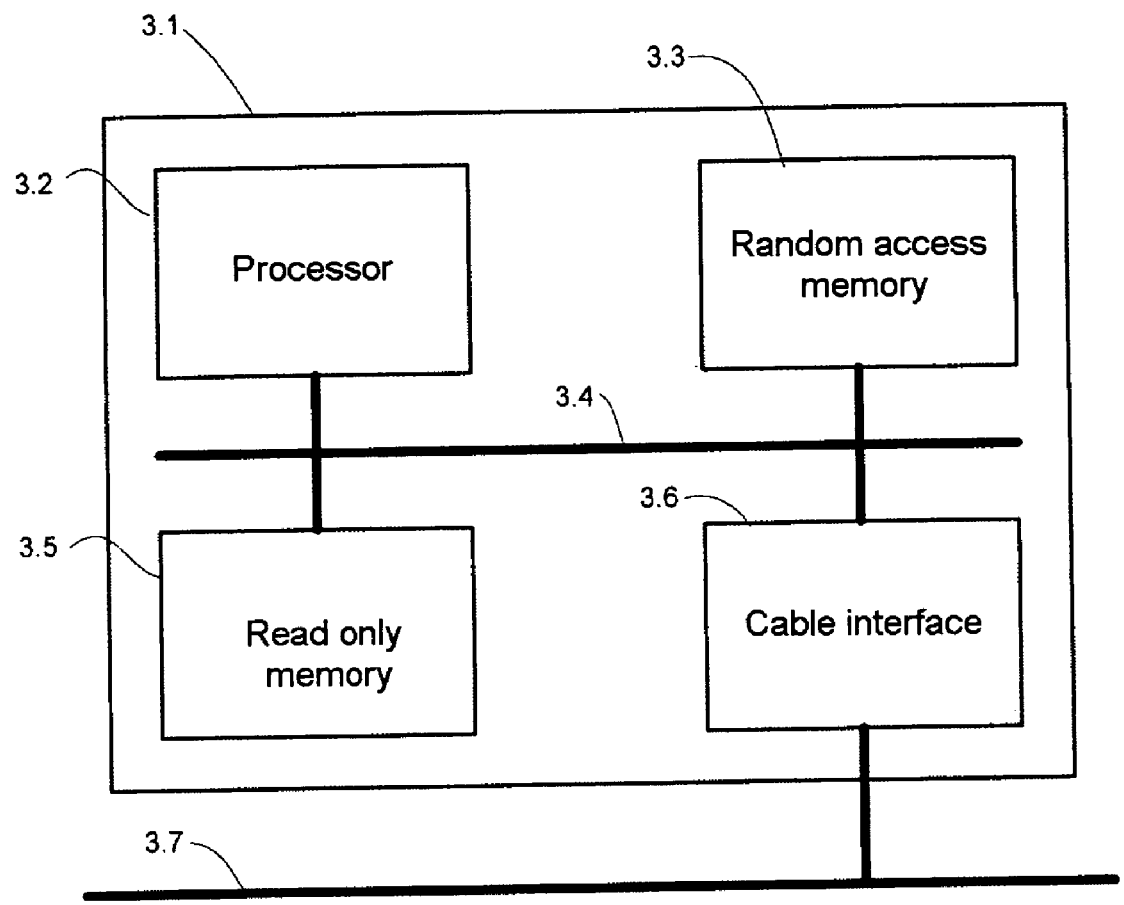
FIG. 3 represents an exemplary embodiment of a general architecture of a domestic appliance bearing an ubiquitous firewall.

FIG. 3 represents an exemplary general architecture of an appliance, referenced 3.1, partaking of a firewall device. Such an appliance comprises a network interface, referenced 3.6, intended to connect the appliance to the network referenced 3.7. It also comprises a permanent memory, referenced 3.5, intended to store the programs necessary for the execution of the firewall according to the architecture of FIG. 2. These programs will be loaded into the random access memory, referenced 3.3, for execution by the central processor referenced 3.2. All these elements will be linked together by a communication bus referenced 3.4. It is obvious to the person skilled in the art that this architecture may vary in the arrangement of these means and is merely an exemplary architecture of an appliance in a position to implement an ubiquitous firewall.

In this way, we have defined an ubiquitous firewall, operating on each appliance of a community of domestic appliances. This firewall will implement a consistent and uniform security policy within the entire community and protect it by filtering the communications. This firewall is totally distributed on each appliance and no appliance plays any particular role in its manner of operation. This policy alters dynamically and adapts automatically to alterations of the connectivity within the community. The user can modify this policy easily without having to ascertain the details of the implementation of the firewall. It will be apparent to the person skilled in the art that the invention may be implemented within the network framework conforming to various communication protocols including those not based on IP and that it does not constitute a departure from the framework of the invention to modify the rules of the security policy that are applied or to modify the functional split of the architecture presented for the ubiquitous firewall.

The invention claimed is:

1. A firewall system comprising a community of interconnectable appliances sharing at least one common global security rule, wherein the firewall system is characterized such that:
    each appliance of the firewall system stores a local security policy comprising the at least one common global security rule, a list of the members of the community as well as of their state of connection, and a list of services offered locally;
    each appliance comprising a filter for messages destined for and originating from a network to which each appliance is connected; and
    each appliance calculates firewall rules used by the filter as a function of the local security policy.

2. The system according to claim 1, wherein each appliance of the community updates the local security policy and triggers a new calculation of the firewall rules used by the filter.

3. The system according to claim 2, wherein the interconnectable appliances reside on a network and wherein the new calculation of the firewall rules used by the filter is in reaction to changes occurring on the network.

4. The system according to claim 3, where the changes occurring on the network are at least one among the following: a change of network address of an appliance of the community, an addition, removal, or banishing of an appliance of the community, and a change of status of a service hosted on an appliance of the community.

5. The system according to claim 1, wherein each appliance of the community determines a list of the appliances outside the community possessing privileged accesses to at least one service offered by an appliance of the community, the list of the appliances outside the community being integrated with the local security policy.

6. An appliance belonging to a community of interconnectable appliances sharing a set of at least one common global security rule, the appliance storing a local security policy having global security rules, a list of the members of the community as well as of their state of connection, and a list of services offered locally, the appliance possessing a firewall comprising a filter of messages destined for and originating from a network to which the appliance is connected, the appliance calculating firewall rules used by the filter as a function of the local security policy, wherein a firewall device is located on each aDDliance on the network.

7. The appliance according to claim 6, which updates the local security policy and automatically triggers a new calculation of the firewall rules used by the filter.

8. The appliance according to claim 7, wherein the new calculation of the firewall rules used by the filter is effected in reaction to changes occurring on the network.

9. The appliance according to claim 8, wherein where the changes occurring on the network affect that trigger a new calculation of the firewall rules used by the filter are at least one among the following: a change of network address of an appliance of the community, an addition, removal, or banishing of an appliance of the community, and a change of status of a service hosted on an appliance of the community.

10. The appliance according to claim 6, wherein the appliance determines a list of the appliances outside the community possessing privileged accesses to at least one service offered by an appliance of the community, the list of the appliances outside the community being integrated with the local security policy.

11. A method of updating firewall rules used by an appliance having a firewall, the firewall having a filter of the messages destined for and originating from a network connected to the appliance, the appliance forming part of a community of interconnectable appliances sharing at least one common global security rule, the appliance storing a local security policy, a list of members of the community as well as of their state of connection, and a list of services offered locally, the firewall rules being calculated as a function of the local security policy, the method comprising the following steps:

detection of addition, removal, and banishing of an appliance of the community;

detection of changes of network address of an appliance of the community; and triggering of a new calculation of the firewall rules in response to a change of the local security policy.

12. The method according to claim 11 further comprising a step of detecting the changes of status of services hosted by the appliance.

13. The method according to claim 12 wherein triggering of a new calculation of the firewall rules is related to:

detection of addition, removal, and banishing of an appliance of the community; and detection of change of IP address of an appliance of the community, and detection of a change of status of a service.

* * * * *